Sept. 9, 1952 J. E. POINTON 2,609,765
DOUGH DIVIDER
Filed May 18, 1948 2 SHEETS—SHEET 1

INVENTOR
JOHN EDWARD POINTON
BY George B Willcox
ATTORNEY

Patented Sept. 9, 1952

2,609,765

UNITED STATES PATENT OFFICE 2,609,765

DOUGH DIVIDER

John Edward Pointon, Peterborough, England, assignor to Baker Perkins Incorporated, Saginaw, Mich.

Application May 18, 1948, Serial No. 27,746
In Great Britain June 6, 1947

3 Claims. (Cl. 107—15)

This invention relates to dough dividers of the type employing a cut-off knife and a charging ram, and wherein motion is imparted to the ram on its charging stroke through spring, hydraulic or similar means, and the ram and knife travel together for a proportion of their stroke after which the knife proceeds to cut off the dough in the top box from the hopper in advance of the completion of the stroke of the ram.

The aim of the present invention is to provide improvements whereby: the dough is subjected to a substantially constant pressure through the charging operation and the ram has a constant length of stroke, irrespective of the weight of dough divided; the adjustment of the device for different weights is of a simple character; the filling of the ram chamber or top box with dough on the return stroke of the ram and cut-off knife is unrestricted, and the action of the ram in both directions is smooth, eliminating any need for a dashpot.

The invention consists in providing novel means for displacing the ram and knife on the charging stroke together for a proportion of the stroke determined by the adjustment of positive stop means for arresting the ram, allowing the knife to proceed to cut off the hopper dough, releasing the stop when cut-off has occurred to allow the ram to move forward to fill the waiting division boxes or pockets, under the action of residual pressure stored in the spring through which motion is communicated to the ram throughout the charging stroke; and finally retracting the knife and ram in substantial coincidence to afford unrestricted entry for the dough into the top box from the hopper.

The invention also comprises a divider of the type described including: an operating lever or member common to the ram and knife by which the knife is positively displaced while the ram is displaced resiliently through spring means, as by connecting the ram to one end of a bell-crank lever pivoted on the common lever and having a spring acting on the other end of the bell-crank lever; an abutment associated with the ram and longitudinally adjustable; a trippable stop with which the abutment engages, and means for tripping the stop as the knife completes or nearly completes cutting off the dough from the hopper.

In the preferred arrangement the knife is mounted such that its stroke is somewhat longer than the ram stroke to compensate for the recovery of the ram on the return stroke and permit the ram face and knife edge to be retracted in substantial coincidence.

Further advantages achieved by the invention are that: knock and shock is eliminated, as the ram spring is mainly unstressed before the knife, owing to its longer stroke, is released from under the hopper frame, and allows the ram to commence the return stroke; and a simplification of apparatus is afforded by the single common operating lever which is oscillated by cam means for imparting displacements to the knife and ram.

In the accompanying drawings:

Figure 3 is a partial top plan view of the parts shown in Fig. 1, and

Figure 4 is a side view of my preferred trip lever locking and releasing device as seen in the direction of the arrows 4—4, Fig. 2, being the rear side of Fig. 1.

Figure 1:
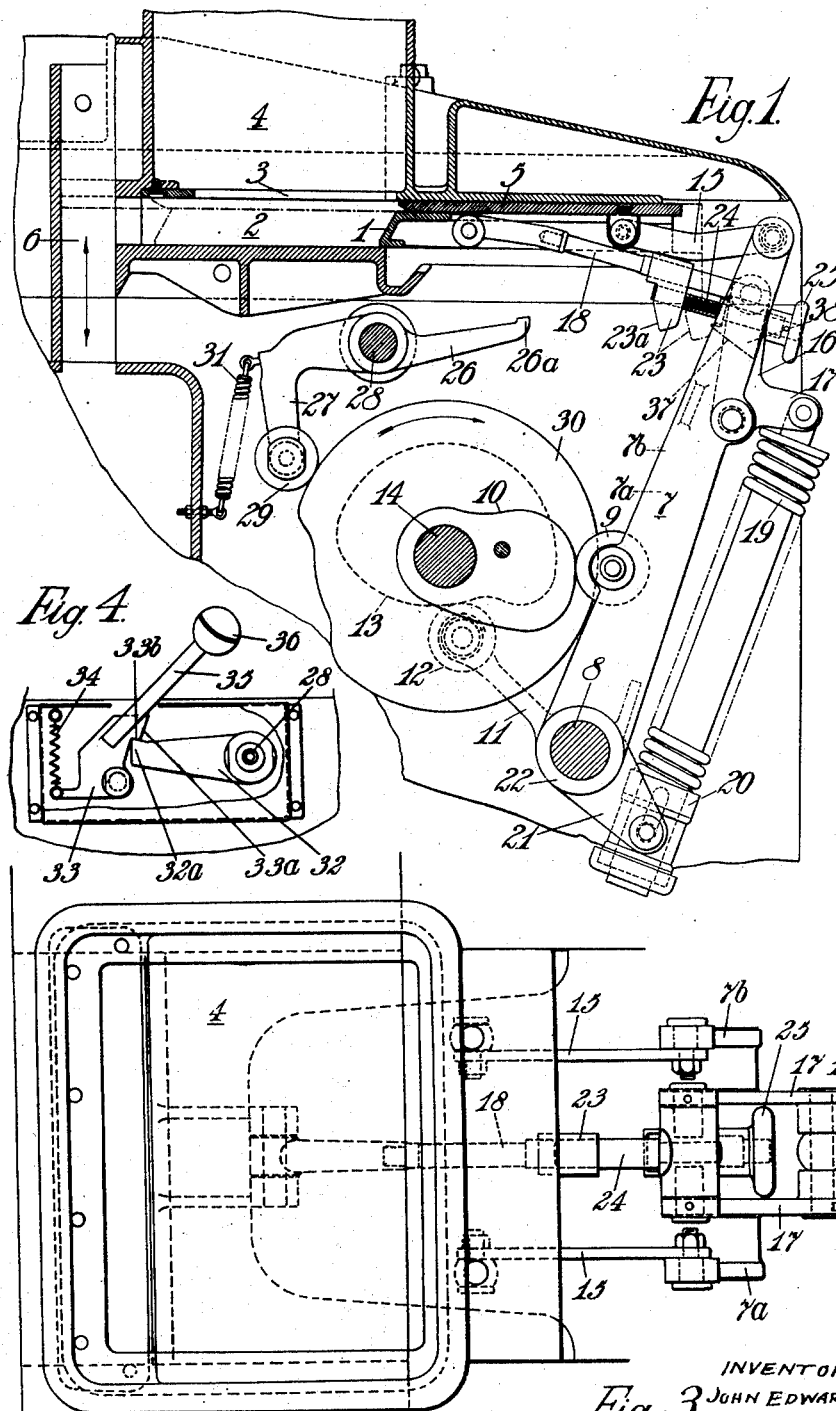
Figure 1 is a side view of a dough divider according to the invention being a vertical longitudinal section on line 1—1 of Fig. 2.
Figure 2:
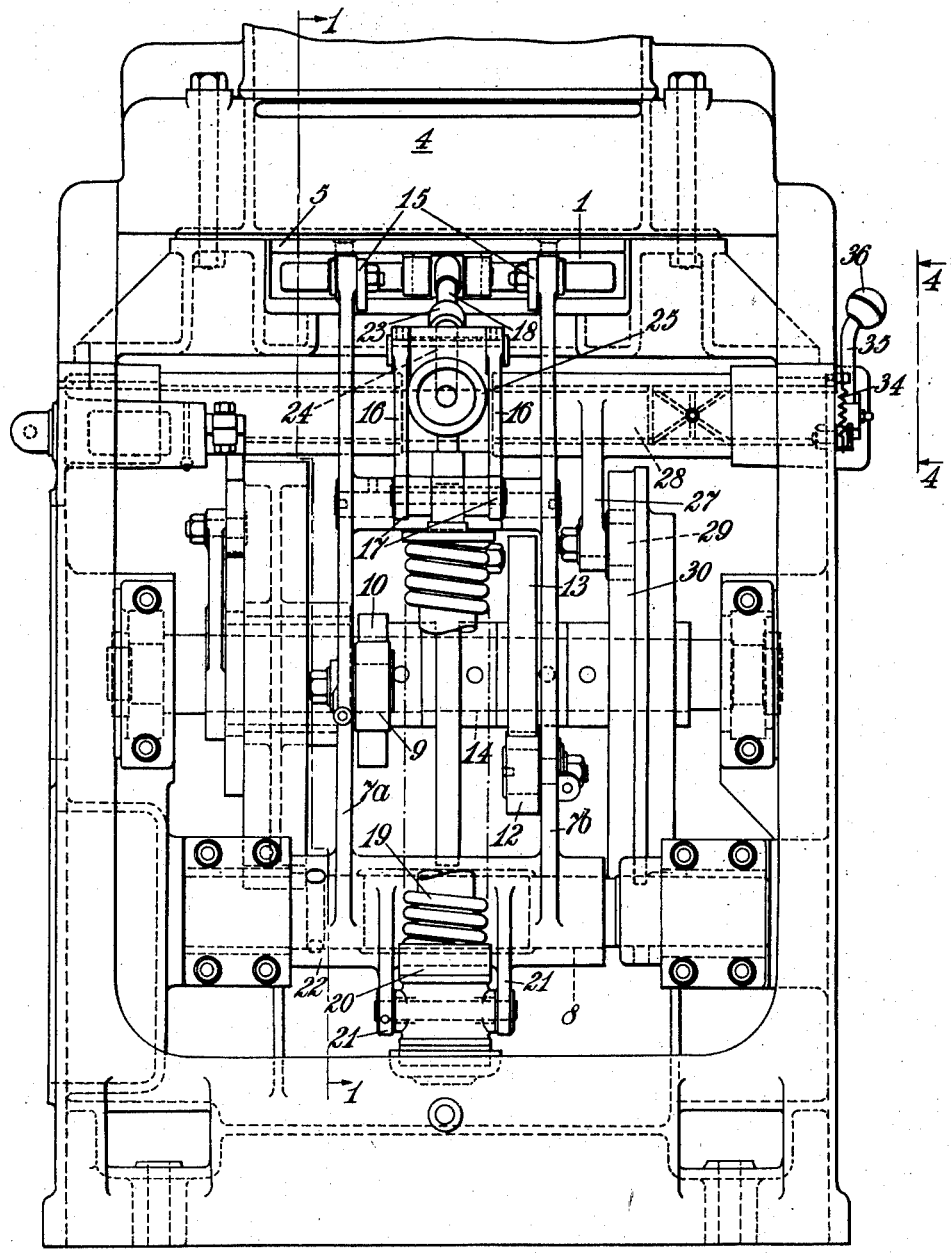
Figure 2 is an end view, in elevation.

In carrying the invention into effect according to one mode, a ram 1 is mounted for reciprocation in a ram chamber or top box 2 below the opening 3 in the dough hopper 4, and between the ram and the hopper a sliding knife 5 is positioned. At the inner end of the top box a displaceable division box 6 or division pocket member of known character is provided, either with or without a die-plate.

Below the ram chamber an operating lever 7 is mounted to pivot on a shaft 8. The lever 7 comprises spaced members 7a, 7b and on one of these there is mounted a cam roller 9 engaging a cam 10 while an extension 11 of the member 7b has a roller 12 engaging a charging cam 13. The cams 10 and 13 are fixed on the cam shaft 14 and through their respective rollers cause a positive pivotal movement of the lever 7 in both directions.

At its upper end the lever 7 lies adjacent the plane of the knife 5 and is connected thereto by a suitable link or links 15. At an appropriate position below the upper free end of the operating lever 7, a bell-crank lever 16, 17 is pivoted, the upright arm 16 of which is coupled by a connecting rod 18 to the ram 1. The lateral arm 17 of the bell-crank lever is engaged by a resilient compression spring 19. An abutment 20 is pivotally mounted upon and between a pair of arms 21 integral with the boss 22 of the lever 7. Spring 19 is kept in a state of perpetual compression by the member 17 and the abutment 20.

The connecting rod 18 operates as a slideway for an abutment block or member 23 constituting a stop means for the ram, which means is displaceable on the slideway by a screwthreaded spindle 24 mounted in the adjacent end of the arm 16 of the ram-operating bell-crank lever, a manipulating handle or wheel 25 being provided at the outer end of the screwthreaded spindle.

The lower part of the forward face 23a of the abutment 23 is adapted to engage a stop or trip member which is introduced in its path to arrest the ram at a predetermined point in its charging stroke. The stop member may comprise a bell-crank lever 26, 27 secured on rock shaft 28 below the top box 2, the lower arm 27 of which lever carries a roller 29 engaged with a trip-actuator, such as cam 30, mounted on the cam shaft 14. The roller 29 is held in contact with the trip cam 30 by a spring 31 anchored to a stationary part of the machine casing. The other arm 26 of the stop lever is formed as a nose 26a for stopping engagement with the abutment 23.

The communication between the dough hopper 4 and the top box 2 takes place through an opening 3 which is substantially the same width as the stroke of the ram 1 while the margin of the opening adjacent the division box 6 is sufficiently wide to permit of a short period of travel of the knife edge after it has cut off.

Owing to the relative positions of the connections 15 and 18 to the knife and the ram to the common operating lever 7, the knife has a somewhat longer travel than the ram, and the knife 5 as it is directly connected to the lever 7 is positively operated in both directions, while the ram 1 due to its connection to the spring-pressed bell-crank lever 16, 17 operates on the dough through the constant pressure of the spring 19.

The cam 30 for tripping the stop lever 26, 27 is of such a form and is so timed that the nose 26a lies in the way of the abutment 23 when the ram 1 is making the early part of its operative stroke. The abutment 23 is adjusted on the connecting rod 18 by manipulation of the handwheel 25 according to the weight of dough divided—for 1-lb. or 2-lb. loaves, for example. The tripping cam 30 is also of such a form that the nose 26a is tripped or retracted from its engagement with the abutment 23 when the knife 5 has just cut off or is nearly finishing its movement at the margin of the hopper referred to above.

In operation, the charging cam 13 swings the common operating lever 7 forward i. e. counterclockwise in Figure 1, and the ram 1 and knife 5 move on the charging stroke together with the forward edge of the knife substantially in line with the face of the ram. Forward movement of the ram continues until its abutment 23 meets the trip stop 26a, when it is arrested, while the common operating lever 7 and knife 5 continue their forward movement. This action compresses or stores energy in the spring 19 acting on the ram bell-crank lever 16, 17. When the forward edge of the knife 5 has moved across the hopper opening 3 and cut off the dough, the trip cam 30 retracts the stop 26a and releases the abutment 23, when the stored energy in the spring 19 sharply acts upon the ram 1 and forces it to complete its charging stroke and push the dough from the top box 2 into the division box 6 which has arrived in the aligned position. On the return stroke the first action is to retract the knife 5 from the marginal portion of the hopper opening and bring it into line with the forward face of the ram 1, when the latter and the knife proceed rearwardly together, progressively opening the top box 2 to the dough of the hopper 4 to the full extent without any throttling action. The knife and ram move rearwardly until they reach their initial position adjacent the rearward side of the hopper opening 3 ready for commencing the next charging stroke.

In order to avoid possible damage should the ram be operated in the absence of dough in the hopper and top box, automatic safety means are provided for rendering the releasable trip lever or release means 26, 27 ineffective. These means comprise an arm 32 secured to the rock shaft 28 adapted to be engaged by a pivoted trip plate 33, Fig. 4, which is held in the operative position by a retaining spring 34. The trip plate is provided with an actuating arm or manually operable lever 35 having a knob 36.

Figure 4 shows the trip plate engaging the arm 32 and thus holding the trip lever 26, 27 out of action.

During normal operation with dough in the hopper 4 and top box 2, the stroke of the ram 1 will be shortened as it will not move to the full extent of travel on its operative stroke owing to the resistance of the dough after the division box 6, is charged. During such operation the point 32a of the arm 32 will slide along the face 33a of the trip plate 33 and the trip lever 26, 27 will remain under the control of the cam 30.

When the hopper 4 is empty the ram 1 will move through its full stroke with the result that the inclined surface 37 on the block 38 carried by the lever 16 will engage the nose 26a of the trip lever or release means and cause said lever to move to a position in which the roller 29 is lifted off the cam 30. At the same time the rocking of the shaft 28 will cause the lowering of the arm 32 to an extent such that the point 32a will slide off the face 33a and become engaged by the projection 33b whereby the arm 32 is locked whereby the trip lever 26, 27 is rendered inoperative. When a fresh supply of dough is placed in the hopper the arm 32 is released manually by the operator moving the arm 35 by the knob 36, bringing the trip lever 26, 27 again into normal operation.

From the foregoing description it will be apparent that invention, novelty and utility are present in the disclosed arrangement of the abutment stop 23 or its equivalent which holds ram 1 at a predetermined position in its stroke until knife 5 cuts off the supply, whereupon the stop is released and the ram then proceeds under the energy stored up in the spring 19.

I claim:

1. A dough dividing machine comprising in combination: a frame; a cam and means rotatably supporting said cam on said frame; a ram and means reciprocably mounting said ram on said frame; an operating lever and means pivotally mounting said lever on said frame; means cooperating with said cam for effecting pivotal motion of said lever upon rotation of said cam; means including resilient yieldable means, comprising energy storage means, connecting a portion of said lever remote from its point of pivotal mounting to said cam and an abutment member movable with said yieldable means; a stop member and means movably mounting said stop member on said frame in the path of motion of said abutment member; another cam and means rotatably mounting same onto said frame and means responsive to rotation of said last named cam for retracting said stop member out of the path of said abutment member; said cams being so shaped and so related to each other that said first named cam will effect pivotal movement of said operating lever toward said stop member and said abutment will engage said stop member, and said cam will then effect continued movement of said lever for effecting energy storage in said resilient member, after which said second cam will effect withdrawal of said stop member out of engagement with said abutment member; whereby the energy stored within said resilient member will effect a continuation of the motion of said ram member without further movement of said operating lever.

2. Apparatus as described in claim 1 wherein said abutment member is mounted directly on the means connecting said ram to said operating lever and is mounted between said ram and said energy storage means.

3. A device as described in claim 1 including also: an automatic safety device for said trip member comprising an arm on said rock-shaft; a pivotally mounted spring-retained trip plate; a block on said coupling means positioned to engage and to move the nose of said trip member out of contact with the said actuator and simultaneously to move the said arm into locking engagement with said trip plate; and a manually operable means for releasing said safety device.

JOHN EDWARD POINTON.

REFERENCES CITED

The following references are of record in the file of this patent:

UNITED STATES PATENTS

| Number | Name | Date |
|---|---|---|
| 1,738,935 | Streich | Dec. 10, 1929 |
| 2,038,733 | Harger et al. | Apr. 28, 1936 |
| 2,408,602 | Bowker | Oct. 1, 1946 |
| 2,408,679 | Palmer | Oct. 1, 1946 |